March 19, 1968    P. H. MILLER, JR    3,373,841
METHOD AND APPARATUS FOR GENERATING SOUND WAVES
Filed April 1, 1966    3 Sheets-Sheet 1

INVENTOR
PARK H. MILLER, JR.
BY Anderson, Luedeka, Fitch, Even & Tabin
ATTORNEYS United States Patent Office 3,373,841
Patented Mar. 19, 1968

3,373,841
METHOD AND APPARATUS FOR GENERATING SOUND WAVES
Park H. Miller, Jr., Del Mar, Calif., assignor, by mesne assignments, to Gulf General Atomic Incorporated, San Diego, Calif., a corporation of Delaware
Filed Apr. 1, 1966, Ser. No. 539,365
25 Claims. (Cl. 181—.5)

ABSTRACT OF THE DISCLOSURE

A novel sound source and method of generating sound waves utilizing the source is disclosed which includes a power system, an oscillatory system and a radiating member coupled to the medium in which the waves are generated. The oscillatory system includes a spring member and an inertial member. The power system is coupled between the spring and the radiator and exerts force periodically on both the spring and the radiator to transfer energy to both of them. The resonant frequency of the source as coupled to the medium is adjustable and the power system is preferably operated at the resonant frequency.

---

This invention relates generally to methods and apparatus for generating sound waves, and more particularly, to a method and a device for generating sound waves in liquids and solids.

In general sound waves may be defined as mechanical waves of all frequencies in all substances or media. Sources of such sound waves have been developed for a variety of applications including geophysical prospecting, underwater ranging and velocity detection, and communication utilizing either water or the earth as a medium for the transmission of information. One type of sound source which has been used to produce waves in the earth consists of a circular plate maintained in forced contact with the surface of the earth by means of the large weight of a truck under which the plate is mounted. The plate is forced to vibrate, thereby producing sound waves in the earth. This source lacks mobility, particularly in undeveloped areas, due to the massive trucks and drive units required.

Another type of sound source for producing seismic waves includes an anchor secured in a hole in the earth and coupled to a plate on the surface of the earth. The anchor and plate are repeatedly forced toward each other, thereby periodically placing the earth between them in compression and producing sound waves in the earth. Such a source, of course, cannot be used in or on bodies of water or in marshland since there is nothing solid to which to secure the anchor. Furthermore, such a source requires the drilling of holes in order to install the source, a process which may be expensive and very difficult, particularly in rocky areas. Still further, at the low frequencies most useful in certain applications, it is preferable to space the anchor from the radiating plate by a distance of the order of 1,000 feet, making the installation of the anchor even more difficult.

Another problem which has arisen, particularly in connection with the design of sound sources for generating sound waves in earth and water, is that relatively large motions of the driving member ordinarily have been required in order to produce the desired amount of radiated energy. Imparting such large motions to a driving member has presented difficulties when a hydraulic drive has been utilized, since such drives are more effective if the driving member is required to move only a short distance, so as to minimize the volume of fluid which circulates during each cycle.

In the present invention, a highly mobile sound source is provided which is suitable for utilization of a hydraulic drive since it is designed so that the driving member moves only a short distance. Generally, the source includes an energy radiating member, such as a force plate, coupled to the medium, and a power system which causes the radiating member to move periodically and transmit sound waves in the medium. The power system is coupled between the radiating member and the spring member of an oscillatory system, the parameters of which may be adjusted so as to control the sound waves transmitted into the medium.

Accordingly, it is an important object of the present invention to provide an improved method and apparatus for generating sound waves.

Another object of the invention is to provide such a method and apparatus which is adapted to produce sound waves in solids or liquids and, more particularly, in the earth or bodies of water.

Still another object of the invention is to provide an improved device for generating controllable and programmable sound waves to produce a signal which may be varied so as to be adaptable for use in range and velocity detection, geophysical prospecting and communication systems.

Yet another object of the invention is to provide an improved method and device for generating consecutive sound waves in solid or liquid at respective ones of a plurality of frequencies within a broad range.

A further object of the invention is to provide a sound source in which relatively large amounts of energy may be efficiently radiated, utilizing a hydraulic drive system.

Other objects and advantages of the invention will become apparent from the following description when considered in conjunction with the accompanying drawings, in which:

In general, an apparatus embodying the features of the present invention comprises a housing 11 on which are mounted a power system 13, an oscillatory system 15 and a radiating member or force plate 17 which is shown coupled to a medium 16, which may be water or the earth.

The oscillatory system in general includes a spring member 18 which exerts a spring or stiffness force tending to restore the system to its initial position and an inertial member 19 which tends to maintain the existing motion of the system. It will be apparent that there are a variety of oscillatory systems which might be utilized in conjunction with the invention including electromagnetic as well as mechanical system, although the invention will be described primarily with reference to the latter.

Furthermore, even in a mechanical oscillatory system the spring and inertial members may have different forms, so long as they still perform the above named functions. Four specific forms of oscillatory systems will be described hereinafter. In addition, it should be noted that it is, of course, a simplification to assume that each member performs only the function appropriate to its appelation: a spring of any type will have mass, and a mass may be resilient. Consequently, the terms "spring member" or "spring" as used herein designate the portion of the oscillatory system whose primary function is to exert a restoring force, and the terms "inertial member" or "mass member" are used to designate any structure, the primary function of which is to resist a change in the motion of the system.

The power system 13 is coupled between the spring member 18 of the oscillatory system 15 and the force plate 17 and is adapted to exert force periodically on both the spring member 18 and the force plate 17 with the result that energy is transferred to the oscillatory system 15 and the force plate 17 form the power system. The force plate 17 is acoustically coupled to the medium so that motion of the force plate 17 causes sound waves in the medium 16.

Specifically, in a preferred embodiment, the power system 13 includes a hydraulically actuated cylinder 20 and a piston 21 defining an upper chamber 22 and a lower chamber 23. As illustrated, the piston 21 is coupled to the spring member 18 and the cylinder 20, is coupled to the force plate 17. As shown in the drawings, the periodic movements of the cylinder 20 and piston 21 are vertical and the oscillatory system 15 is disposed above the power system 13 which in turn is above the force plate 17. For clarity, only this specific orientation will be described but no unnecessary limitation is to be implied therefrom.

For further ease of description, the condition of the spring member 18 during various portions of a cycle will be described herein as "relaxed," "compressed" or "tensioned." These expressions are commonly used to describe a simple oscillatory system comprising an idealized mass and an idealized spring; however, as used herein they are generalizations for the comparable condition of the "spring" member of any oscillatory system. Consequently, the use of these terms should not be construed so as to limit the scope of the invention. In addition, for convenience of description of the operation of the system, it will be assumed that the inertial member or mass 19 is positioned above the spring 18 and oscillates vertically. In this relative disposition, upward movement of the piston 21 and downward movement of the mass 19 will tend to compress the spring 18 while the opposite movements of the piston 21 and mass 19 will tend to stretch or tension the spring 18. No unnecessary limitation should be implied from this conventional description of the disposition of the various parts of the system.

Whenever the hydraulic pressures in the chambers 22 and 23 are unequal, the difference in pressures causes equal and opposite forces to be exerted on the force plate 17 and the oscillatory system 15 by cylinder 20 and piston 21, respectively.

The initiation of operation of the sound source will be described in detail below after the structure has been completely described. First, however, the general operation of the power system 13 and oscillatory system 15 in the steady state will be described. This may conveniently begin at the point in the cycle when there is equal pressure on both sides of the piston 21, the spring 18 is relaxed, and the mass 19 is moving upwardly at its maximum velocity.

At this point the power system 13 is caused to decrease or release the pressure in the lower chamber 23. The pressure differential thus created between lower chamber 23 and upper chamber 22 tends to move the piston 21 downward relative to the cylinder 20 to equalize the pressure. The cylinder 20 acts as a driving member to cause the force plate 17 to move upward. The piston 21 similarly acts as a driving member to exert a downward force on the spring member 18, thereby tending to tension the spring at the same time that the upward movement of the mass 19 is also tensioning the spring. The mass 19 reaches its maximum upward displacement, reverses its direction of motion and then returns to its initial position, at which point the spring 18 is relaxed and the mass 19 is moving downward at its maximum velocity.

At this point in the cycle the pressure in the two chambers 22 and 23 has substantially equalized at a lower value due to the downward movement of the piston 21 relative to the cylinder 20. The pressure in the lower chamber 23 is then restored to its initial value so that a pressure differential exists between the two chambers moving the piston 21 upward relative to the cylinder 20, again relieving the pressure differential. As the mass 19 continues to move downward, the spring 18 is compressed between the mass 19 and piston 21 until the mass 19 reaches its maximum downward displacement, whereupon the mass 19 starts to move upward under the restoring force of the spring 18 and moves thus until the oscillatory system 15 reaches the condition at the beginning of the cycle.

During the first half cycle, the tension in the spring 18 pulls up on the piston 21 and maintains a greater pressure in the upper chamber 22 than in the lower chamber 23. The greater pressure in the upper chamber 22 pushes the cylinder 20 upward more than the lesser pressure in the lower chamber 23 pushes the cylinder 20 downward, resulting in a net upward force on the force plate 17, which is coupled to the cylinder 20.

During the second half of the cycle as just described, the cylinder 20 acts as a driving member to cause the force plate 17 to move downward due to the greater pressure in the lower chamber 23 than in the upper chamber 22 which is occasioned by the force exerted by the spring 18 on the piston 21.

It may be seen that a relatively small movement of the piston 21 in the cylinder 20 may be associated with extremely large movements of the inertial member 19. Since the amount of energy radiated by the force plate 17 is determined by the product of the mass of the inertial member 19 and the distance through which it moves, it is thus possible to radiate relatively large amounts of energy with only small movements of the driving member and an inertial member of relatively small mass. This feature is particularly useful in a hydraulic drive system, since the volume of fluid moved in each cycle may thus be effectively minimized. The improvement, either as to the mass required or the amount of piston movement required, is dependent upon the Q of the system as coupled to the medium 16.

The operation described above is repeated cyclically in rapid succession and, as a result, the periodic movement of the force plate 17 generates a sound wave in the medium. It may be seen that the entire sound source as coupled to the medium 16 will have a resonant frequency which depends upon the parameters of the oscillatory system 15. It is preferred that the power system 13 be operated at this resonant frequency or a subharmonic thereof. At the resonant frequency, the power system 13 operates at the same points in each cycle and adds energy to the system 15 equal to the energy radiated by the force plate 17 at this resonant frequency (plus any system losses). Similarly, operating at a subharmonic, the power system 13 adds the energy at the same points in cycles displaced from one another by an intergral number of cycles.

The entire sound source system is designed so that a large number of force impulses can be applied to the medium 16 consecutively, e.g., 30 consecutive impulses, and so that these impulses can be applied within a short period of time, e.g., at a frequency of 100 cycles per second. The system is also designed so that such a series of impulses can be applied repeatedly over a long period of time so that a large quantity of acoustic energy may be applied to the medium.

Moreover, as will become apparent below, the system is designed so as to permit selective variation in the frequency over a wide range. This feature makes it possible to provide a series of sound wave trains, each at a different frequency, which, when detected, may be passed through filtering apparatus to produce well defined peaks which may be useful in seismic prospecting or indicative of range and relative velocity or of encoded information. The utilization of such wave trains for such purposes is described in greater detail in the copending application of Miller, Pound, Snodgrass, for "Geophysical Prospecting by Comparing the Times of Application With the Time of Occurrence of the Combined Received Seismic Signals," Ser. No. 382,086, filed July 13, 1964, and in my copending applications filed Apr. 1, 1966, entitled "Method and System for Range and Relative Velocity Detection," Ser. No. 539,352, and "Method and System for Communication of Information," Ser. No. 539,381.

Turning now to a more specific description of the apparatus, the housing 11 on which the power system 13, oscillatory system 15 and force plate 17 are disposed may be a barge or the hull of a ship in the case where it is desired to generate underwater sound waves or may be a smaller water-tight container having a generally flat bottom in the case where it is desired to produced seismic waves in the earth. The force plate 17 is disposed in an opening through a wall of the housing 11, which as shown is the bottom wall of the barge or container, and is formed of a rigid material. As illustrated, a flexible waterproof diaphragm 24 surrounds the force plate 17 and interconnects the force plate 17 and housing 11 so that the plate can move freely relative to the housing.

Alternatively, the force plate 17 and housing 11 may be rigidly connected to one another or formed as a rigid unit so that operation of the power system 13 causes vibration of the entire housing 11 rather than only the force plate 17. This has particular utility where a sound source which is adapted to be submerged in water is desired, for the housing 11 may be a waterproof container within which the power system 13 and oscillatory system 15 are disposed so that the sound source can be completely submerged. In such an embodiment, rigid couplings between the power system 13 and the cylinder 20 may be utilized.

As illustrated, however, the power system 13 to which the force plate 17 and oscillatory system 15 are connected is mounted on a generally horizontal platform 25 securely attached to the housing 11 by legs 26. The platform is disposed within the housing 11 above the plate 17 and has a central aperture 27 through which connection of the power system 13 to the plate 17 is effected as will be described hereinafter in detail. In this disposition, the power system 13 and oscillatory system 15 are adapted to cause a vertical force to be repeatedly exerted by the force plate 17 on the medium 16 and thereby generate a sound wave in the medium 16.

Figure 3:
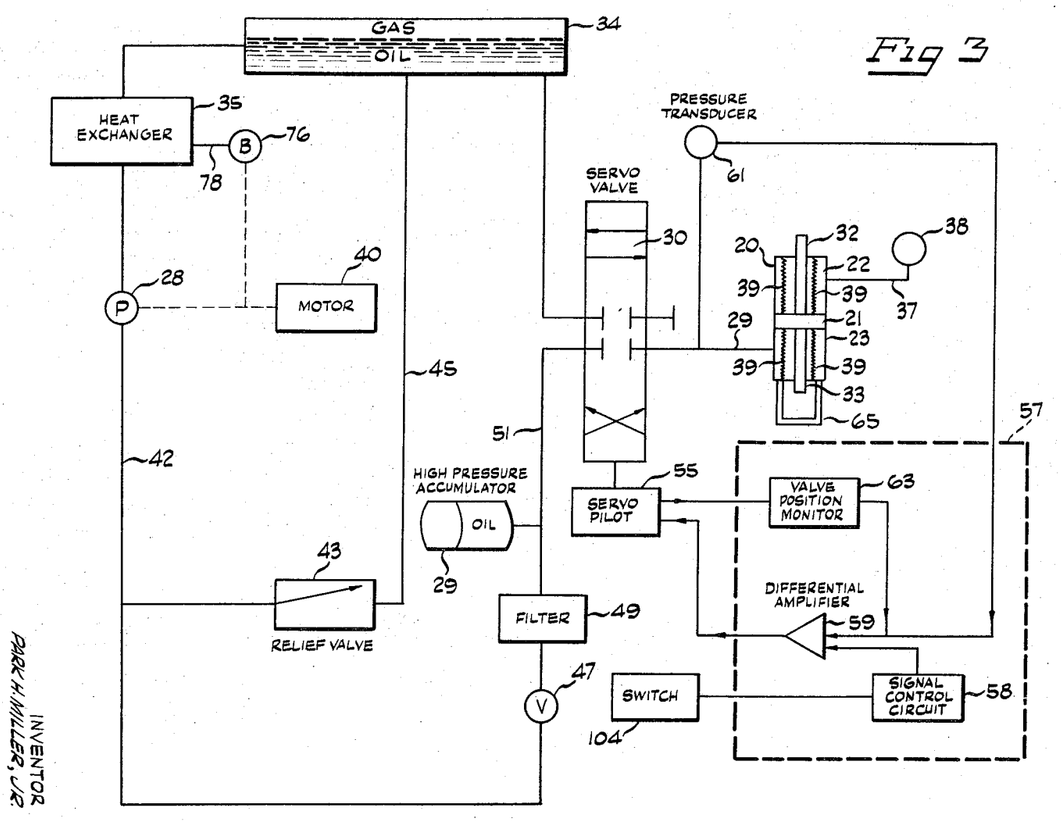
FIGURE 3 is a diagrammatic view of the hydraulic system of the device of FIGURE 2.

The force generating or power system 13 generally comprises a hydraulically actuated ram which includes a pump 28 providing a flow of oil under pressure to a high pressure accumulator 29 suitably connected to a servo valve 30. The servo valve 30 controls the flow of fluid through a flexible conduit 31 to the lower chamber 23 of the hydraulic cylinder 20 housing the piston 21. The piston 21 is suitably connected to the oscillatory system 15 by a piston rod 32. The piston 21 is also provided with a shaft 33 on its lower face extending through the lower chamber 30 so as to equalize the effective areas of the upper and lower face of the piston 21. The fluid provided by the pump 28 is exhausted from the lower chamber 23 to a low pressure accumulator 34 and thence to a heat exchanger 35, from which it is returned to the pump 28.

As illustrated, the conduit 31 is connected to the lower chamber 23 of the hydraulic cylinder 20 so that pressure applied through the conduit 31 to the lower chamber urges the piston 21 upward relative to the cylinder 20. The upper chamber 22 of the hydraulic cylinder is connected through a rigid conduit 37 to a hydraulic accumulator 38 containing gas which is initially at a predetermined pressure, which pressure may be achieved by a connection (not shown) to the high pressure accumulator 29. The size of the accumulator 38 and the amount of gas therein have some effect upon the resonant frequency of the oscillatory system, but this effect is preferably made negligible by utilizing an accumulator of appropriate dimensions with an appropriate amount of gas. When the source is not operating, the accumulator 38 aids in stabilizing the position of the piston 21, since at such times the pressure in the accumulator 38, and hence, in the upper chamber 22 is equalized with the pressure in the lower chamber 23 supplied through the conduit 31 from the high pressure accumulator 29. There is a certain amount of leakage around the piston 21 which would permit the rest position of the piston to vary were it not for spring 39 which act to centralize the piston. The springs 39 are relatively weak so that they have no appreciable affect upon the action of the power system 13 to drive the oscillatory system 15 or upon the resonant frequency of the oscillatory system.

On alternative power system 13 would include a positive drive pushing the piston down as well as up. This may be acomplished by suitable connections of the high pressure accumulator 29 to both the upper chamber 22 and lower chamber 23 of the cylinder 20 which connections may be selectively opened and closed by a suitably controlled servo valve in a conventional manner.

More specifically, in the illustrated embodiment, the pump 28 is preferably of a type which is capable of discharging at high pressure, e.g., at pressures of the order of 5,000 pounds per square inch, but need not be a high capacity pump if it is desired to economize on power. The pump should be capable, however, of recharging the high pressure accumulator in a short period of time after a series of force impulses. The pump of the illustrated embodiment is mounted directly on the shaft of a motor 40 to conserve space and eliminate the need for separate connecting means. Preferably, a shock absorber 41 is provided between the platform 25 and the assembly of the motor 40 and the pump 28.

The pump 28 discharges into a conduit 42 providing communication to a relief valve 43. Pressure is built up in the high pressure accumulator 29 to a predetermined magnitude determined by the relief valve 43. Fluid which is in excess of that required to maintain this pressure is bled back to the low pressure side of the system by a conduit 45 leading directly to the low pressure accumulator 34. The fluid which flows to the high pressure accumulator 29 during the pressure build-up goes directly to a check valve 47 and then to a fine oil filter 49. The check valve 47 prevents back flow, which might rupture the oil filter.

The filtered oil is stored in the high pressure accumulator 29 which permits the use of a pumping system of relatively small capacity. More specifically, a pumping system of small capacity operating continuously to charge the accumulator 29 is equivalent to a system of greater capacity operating intermittently to supply the periodic high flow rates needed to operate the apparatus. In the preferred embodiment, the high pressure accumulator 29 is of the bladder type utilizing a gas, such as nitrogen, under pressure. The high pressure oil from the check valve 47 and filter 49 and from the high pressure accumulator 29 is supplied through suitable conduits 51 to the electro-hydraulic servo valve 30.

The servo valve 30 controls the flow of the fluid to and from the lower chamber 23 of hydraulic cylinder 20 and in turn is controlled by a servo pilot 55. The servo pilot 55 is electrically connected to a system control 57 so that a selected signal, such as a sine wave of any selected frequency, may be applied to it. The signal is effective to cause the servo valve 30 to operate at the selected frequency and thus cause periodic forces to be applied to the medium 16 by the plate 17. The servo valve preferably has a high frequency response of at least 100 cycles per second and the high pressure accumulator 29 has a capacity sufficient to enable the system to undergo repeated cycles in a relatively short time interval, e.g., 100 cycles per second where underwater sound waves are to be produced for use with the systems described in any of the previously mentioned copending applications.

The system control 57 includes a signal control circuit 58 which may, for example, be a magnetic tape device having a readout head and supplied with a magnetic tape on which the desired signal is recorded. This signal may be, for example, a series of wave trains, each of different frequencies, recorded in any desired order on the magnetic tape. The tape may also have recorded on it a trigger pulse at suitable predetermined intervals which causes a change in the resonant frequency of the sound source as coupled to the medium at the same time that the frequency of the applied signal is changed. The output of the control signal circuit is applied to a differential amplifier 59, the output of which is fed to the servo pilot 55.

In order to generate a sound wave by applying force to the medium 16 in a manner which closely follows the phase of the electrical signal, the differential amplifier 59 is also fed a signal which is proportional to the pressure. This signal originates in a pressure transducer 61 which is hydraulically connected to the conduit 31 and electrically connected to the differential amplifier 59. The output of the differential amplifier 59, when fed to the servo pilot 55, causes the force exerted by the power system 13 to follow the electrical signal.

A valve position monitor circuit 63 may be placed in the system control, which circuit senses the position of the spool of the servo valve 30 and applies a signal indicative thereof to the differential amplifier 59. This circuit compenstaes for time lags between the operation of the servo valves 30 and the change in pressure on the lower face of the piston 21. The amount of feedback, of course, depends upon the exact parameters of a particular apparatus designed in accordance with the invention.

In practice, it is desirable that the change in pressure on the lower face of the piston 21 occasioned by the opening and closing of the servo valve 30 be relatively rapid. This result is not readily achieved at high frequencies when the signal applied by the signal control is a sine wave as previously mentioned. It has been found that the result may be achieved utilizing a square wave as the signal rather than a sine wave. The inevitable inefficiencies of the hydraulic, mechanical and electrical components cause the actual pressure in the chamber to vary substantially sinusoidally while the system controls previously desrribed cause the phase of the pressure variations to closely follow the phase of the electrical signal.

The hydraulic cylinder 20 is rigidly coupled to the force plate 17 by a connecting rod 65 extending through the aperture 27 in the platform 23. The rod 65, as illustrated, is tubular and vented to the air as at 66 to accommodate movement of the shaft 33. The piston rod 32 extending upward from the piston 21 is connected to the oscillatory system 15 and can be utilized, if desired, in conjunction with the weight thereof to maintain the piston 21 in its lowermost position when the system is not being operated. Accordingly, when pressure is applied to the fluid within the lower chamber 23 of the cylinder 20, the piston 21 is forced upward relative to the cylinder 20 until the desired equilibrium position is reached.

The pressure is applied and then vented off with appropriate timing controlled by the frequency of the wave applied to the amplifier 59 from the signal control circuit 58 to cause the apparatus to produce the desired number of pulses at a selected frequency and duration. The oil vented from the cylinder is exhausted to the low pressure accumulator 34 which, as shown, is toroidal in shape and is positioned on the platform 25. The low pressure accumulator 34 utilizes a gas-oil interface and acts as a reservoir for the entire hydraulic system.

The low pressure accumulator 34 discharges through the heat exchanger 35 back to the pump 28. Accordingly, the low pressure accumulator 34 assists in the cooling of the oil by effecting a mixing of the oil with a large volume of relatively cooler oil and, in conjunction with the relief valve 43, by permitting a constant circulation of oil through the heat exchanger 35 even when the servo valve 30 is closed. The low pressure accumulator 34 also provides a means of absorbing the hydraulic shock and an expansion volume for the oil as its thermally expands and contracts. The heat exchanger utilizes a blower 76 which forces air into the heat exchanger through a flexible duct 78. The blower 76 is powered by a connection to the shaft of the pump motor 40.

As previously noted, the oscillatory system 15 generally comprises a spring member 18 and an inertial member 19 and is connected to the power system 13 and the force plate 17. More particularly, in the embodiment illustrated in FIGURE 1, the oscillatory system 15 includes a spring member 18 in the form of a flexible bar 84 attached at its center to the piston rod 32. Equally spaced from the center of the bar 84 and, as illustrated, adjacent its ends are attached two massive compact weights 86 which comprise the inertial member 19. The mass of the weights 86, their location on the bar 84, and the dimensions and the modulus of elasticity of the bar, determine the resonant frequency of the sound source as coupled to the medium 16. The resonant frequency may be conveniently changed by adding or removing weights 86 or moving them to different locations on the bar 84. This is most easily done when the masses are at rest, i.e., when they are at their maximum displacement if the system is operating, or at a time when the system is not operating. Another means of changing the resonant frequency may be utilized when the bar is not symmetrical about an axis. In this case, rotation of the bar about its axis will change the resonant frequency, but such an adjustment is limited to a rotation of 90° to avoid non-vertical modes of vibration. It would also be possible to provide two such bars mounted parallel to one another in a horizontal plane. In such an embodiment the resonant frequency may be changed by rotating the bars by the same amount, in opposite directions about their respective axes and such an adjustment is not limited to a rotation of 90°, since symmetry about a vertical axis is preserved by the equal rotations.

Figure 1:
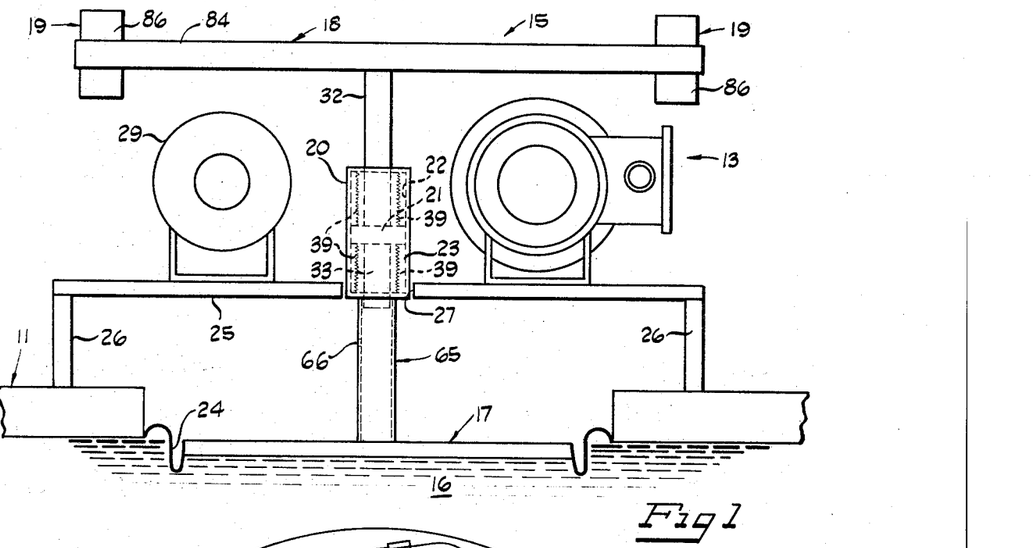
FIGURE 1 is a side elevational view of an apparatus showing various of the features of the invention.
Figure 2:
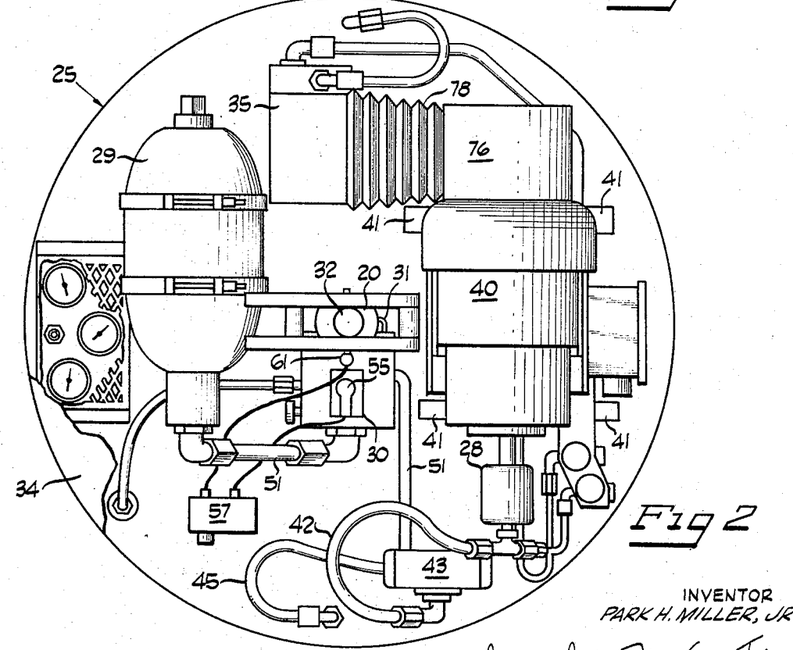
FIGURE 2 is an enlarged partially broken away plan view of the apparatus of FIGURE 1 with certain elements omitted for clarity.
Figure 4:
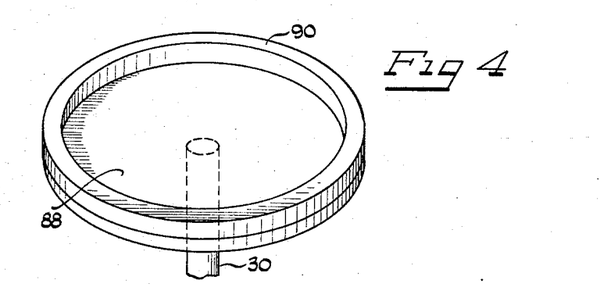
FIGURE 4 is a perspective view showing an alternative embodiment of the oscillatory system of the invention.

In the alternative embodiment illustrated in FIGURE 4, the bar 84 is replaced by a circular flexible plate or disc 88 which is attached at its center to the piston rod 32. The compact weights 86 shown in FIGURE 1 are in the embodiment of FIGURE 4 replaced by massive rings 90 which are clamped to the periphery of the disc 88. In this embodiment the masses and dimensions of the disc and rings and the modulus of elasticity of the disc determine the resonant frequency of the sound source as coupled to the medium 16. The resonant frequency of this embodiment may be changed by adding or removing rings 90, which, as in the embodiment of FIGURE 1, may most easily be accomplished when the rings are at rest. Alternatively, different discs having different masses, dimensions and moduli of elasticity could be utilized at different times. Replacement of one such disc by another may most conveniently be accomplished when the system is not operating.

Figure 5:
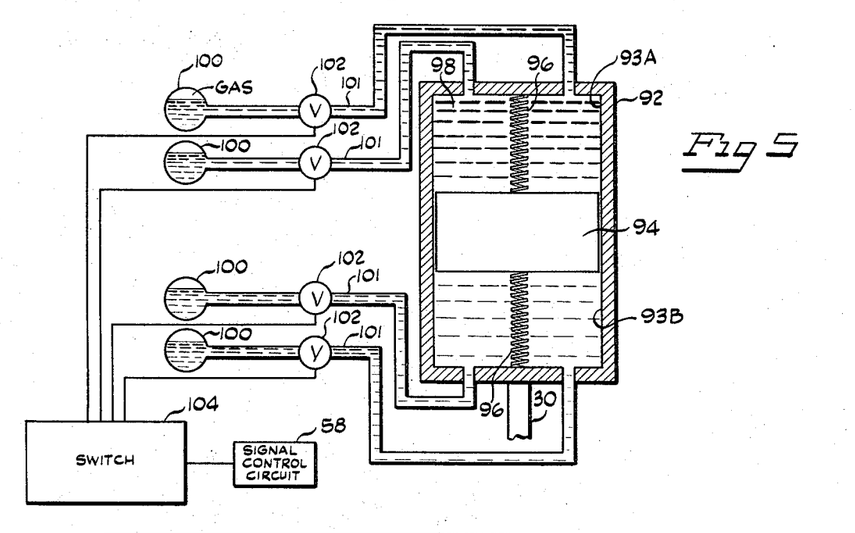
FIGURE 5 is a partially diagrammatic and partially sectional view showing still another alternative embodiment of the oscillatory system of the invention.

The further embodiment illustrated in FIGURE 5 utilizes a fluid spring. An embodiment utilizing a fluid spring is superior to the previously described embodiment in that greater forces can be exerted on the spring without causing mechanical failure of the system components. The fluid spring comprises a chamber 92 made of a lightweight rigid material and defining a cylindrical cavity. The chamber 92 is mounted on the end of the piston rod 32. Within the chamber 92 is disposed a movable piston 94 in the form of a massive body which is approximately centered vertically in the cylinder by light metal springs 96 thus dividing the cavity into an upper portion 93A and a lower portion 93B. The cylinder 92 is filled with a fluid 98 which, as shown, is a liquid but may also be a compressed gas such as compressed air. The piston 94 slides freely in the cylinder. A small amount of leakage of fluid between the upper and lower portions of the cylinder 92 is permitted in order that the mass may slide freely. It may be seen that in this system the massive piston 94 as well as the mass of liquid 98 constitute the inertial member 19 while the confined liquid 98 constitutes the spring member 18, with the resonant frequency of the sound source as coupled to the medium 16 depending upon the dimensions of the cylinder, the compressibility of the liquid and the masses of the piston 94 and liquid 98.

In the illustrated embodiment, the upper and lower portions of the chamber 92 also communicate with a plurality of hydraulic accumulators 100 which may be rigidly mounted on the platform 25. The cylinder 92 and accumulators 100 are connected by flexible hoses 101 provided with suitable electromechanical valves 102. The accumulators 100 contain a predetermined amount of gas. With the valve 102 open to an accumulator, the spring constant of the fluid spring depends in large part upon the pressure and volume of the gas in the accumulator. The resonant frequency of the sound source as coupled to the medium 16 may therefore be changed by opening and closing particular valves to couple respective accumulators 100 to the chamber 92. This changes the effective volume of gas furnished by the accumulator 100. Alternatively, the pressure in an accumulator 100 may be varied to change the resonant frequency, as will be described below in connection with FIGURE 6. In either event the accumulators 100 are operated in pairs to maintain symmetry of the upper and lower portions of the chamber.

This change in the spring constant is most conveniently done when the mass is at zero displacement from equilibrium but has its highest velocity. If this is accomplished in a time which is short in comparison with the period of oscillation, essentially no work is required to perform the operation, and no potential energy is stored in the spring during the changeover. The opening and closing of the valves may be governed by the controls 57 and in particular, the signal control circuit 58. As previously mentioned, this circuit 58 may include a magnetic tape having recorded thereon a signal such as a series of wave trains at predetermined frequencies which are applied to the differential amplifier 59. The tape may also have recorded thereon trigger pulses at the points where it is desired to change the spring constant and the resonant frequency. Thus, when the frequqency of the control signal is changed, a conventional switch means 104 responsive to the trigger pulses may be used to change the resonant frequency of the sound source as coupled to the medium at the same time.

Figure 6:
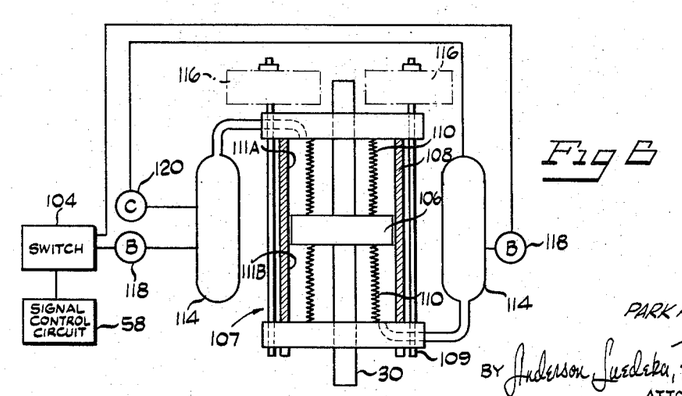
FIGURE 6 is another partially diagrammatic and partially sectional view showing yet another alternative embodiment of the oscillatory system of the invention.

In the further embodiment of a fluid spring system shown in FIGURE 6, an oscillatory system 15 is provided in which the fluid spring utilizes a compressed gas. In this embodiment, a light-weight piston 106 is mounted on the end of the piston rod 32. The piston 106 is mounted for reciprocating movement in the cylinder 107 having massive walls 108 and mounted on a massive supporting structure 109. As in the embodiment of FIGURE 5, metal springs 110 aid in stabilizing the piston position. The upper portion 111A and lower portion 111B of the cylinder cavity are each pressurized with compressed gas and are each connected to an accumulator 114 mounted on the supporting structure 109. The accumulators 114 serve the purpose of increasing the effective volume of the cylinder cavity and might be eliminated in certain applications where less volume is required. It may be seen that in this embodiment the inertial member 19 comprises the massive walls and supporting structure as well as the accumulators 114 and the gas therein. The compressible gas constitutes the spring member 18.

Extra weights 116 shown in broken lines may be added to the supporting structure 109 to change the mass of the oscillatory system 15 and thereby change the resonant frequency. A more convenient way of changing the resonant frequency is by changing the pressure in the accumulators 114, thereby changing the spring constant, as mentioned above in connection with FIGURE 5. As illustrated, this is done by bleed valves 118 connected to the accumulators 114 and to switch means 104 controlled by the signal control circuit 58. As indicated in connection with FIGURE 5, this is most conveniently accomplished when the inertial member is at zero displacement from equilibrium. A gas compressor 120 is also connected to the accumulators 114 so as to provide them with a desired pressure. In operation it is preferable to begin by operating the gas compressor 120 to produce the highest desired pressure in the accumulators 114 so that the system will have a resonant frequency at the top of the desired range. Thereafter lower frequencies are achieved by releasing predetermined amounts of gas through the bleed valves 118 as controlled by the switch means 104 and the signal control circuit 58.

In operation of the apparatus, the force plate 17 is placed in contact with the medium 16, either directly or indirectly. If the medium 16 in which the sound waves are to be produced is a body of water or marshland, the housing or barge is simply floated on the surface of the body or submerged therein if the water-tight housing previously mentioned is utilized. If the medium is the earth, a body of water may be created by placing a waterproof container having vertical walls upon the ground, filling it with enough water to float the source and then placing the source in the water. The container may in fact be an earthen dike defining a shallow pool and acoustic coupling is possible to earth which is simply saturated with water.

Fluid under pressure is supplied to the upper chamber 22 and the lower chamber 23 of the hydraulic cylinder 20 which tends to stabilize the piston 21 in its initial position in the cylinder 20. The pressure in the lower chamber 23 of the cylinder 20 is then released, and the greater pressure in the accumulator 38 pushes the piston 21 downward so as to stretch the spring while forcing the cylinder 20 and the force plate 17 upward.

In the initial cycle of operation, the initial opening of the valve 30 is effectievly at the time in the cycle when the mass 19 is at the top of its travel. This is one-quarter cycle too late for the steady state condition, and the valve 30 is therefore preferably operated one-quarter cycle later to repressure the chamber 23 and place the power system in synchronism with the resonant system during the first cycle. This may be achieved by an appropriate signal from the signal control circuit 58. On the other hand, if the signal control circuit 58 supplies complete cycles from the start, the system will fall into synchronism after a few cycles. Thereafter, the operation continues as hereinabove described with a signal having a selected frequency being supplied to the servo pilot 55 which actuates the servo valve 30 so as to cause the pressure within the lower chamber 23 to be successively released and restored as the inertial member passes through the position where it has maximum velocity.

Preferably, in operation the system control 57 is adjusted so that the frequency applied to the servo pilot 55 is the resonant frequency of the sound source as coupled to the medium 16. The resonant frequency of the entire system depends upon the parameters of the oscillatory system 15 and may be adjusted by changing the effective inertia or the effective spring constant or both. The exact manner in which this is done depends upon the particular embodiment as noted above. It is also within the scope of the present invention to operate the servo pilot 55 at a subharmonic of the resonant frequency.

When the system begins to operate with the inertial member 19 at rest in its position of zero displacement and the piston 21 and cylinder 20 in their equilibrium position, there is no energy stored in the oscillatory system 15. Consequently, the forces exerted by the oscillatory system 15 on the piston 21 and the resulting energy radiated by the force plate 17 will be small at first. Each time the cycle is repeated, however, energy is added to the oscillatory system 15. Consequently, the forces on the piston 21 exerted by the spring member 18 is increased in each cycle which, in turn, increases the range of pressure differentials in the upper chamber 22 and lower chamber 23 and the forces exerted on the medium 16 by the force plate 17.

When the cycle is repeated at the resonant frequency of the entire system as coupled to the medium 16, the system will rapidly reach the saturation state where the amplitude of each radiated wave is the same as that of the next wave. In this state as much energy is transferred into the system as is dissipated by radiation and system losses.

In operation of any of the embodiments, in accordance with any of the previously mentioned copending applications, it may be desirable to send out a series of successive wave trains or pulses each of which has a different frequency. Consequently, it is desirable that both the resonant frequency of the entire system as coupled to the medium 16 and the frequency at which pressure is applied to the piston and cylinder be easily changed and that the amplitude of each wave train be relatively constant.

Achieving this result requires that the parameters of the oscillatory system 15 be changed so as to change the resonant frequency of the entire sound source as coupled to the medium 16 at the same time that the frequency at which pressure is applied by the power system 13 is changed. This may be most conveniently done, as previously noted, in the embodiments of FIGURES 5 and 6 by conventional switch means 104 keyed to the frequency and trigger pulses supplied by the signal control circuit 57.

For the operations described in the previously mentioned copending applications, it is also desirable that the amplitude of the radiated waves in each wave train be constant; therefore, it is desirable to operate the sound source at saturation. In the mode of operation where the wave trains immediately succeed one another, energy is already in the oscillatory system when the frequency is changed, and saturation is quickly established except for the first wave train transmitted.

It is preferred to radiate the frequencies in order of descending frequency; that is, the signal produced by the control signal circuit begins with the highest frequency and proceeds through adjacent frequencies to the lowest frequency. When this procedure is utilized, the change of energy in the system required to change from one frequency to another is minmized and the signal reaches the desired amplitude or saturation state within a few cycles. Further, the first frequency is built to the desired amplitude in a short time.

The first frequency may also be driven promptly to saturation by priming the system by mechanically moving the system to its position of maximum displacement prior to initiation of application of the signal to the hydraulic system. Alternatively, the priming may be effected by utilizing the hydraulic system to start and build up oscillations of the system at a frequency which is different than that recognized by the receiving apparatus. Subsequently, when transmission of the desired frequency begins, the change of energy in the system required to achieve signals of the peak amplitude at the useful frequencies will be minimal.

Examples of specific embodiments of apparatus embodying various features of the invention are set forth below. It should be considered that these data are merely illustrative of certain of the features of the invention and should not be construed as limiting the invention to specific structural materials or operating conditions.

An apparatus is provided for generating a sound wave in water which includes a hydraulic power system having a high pressure hydraulic pump 28 having seven pistons and rated at 0.7 gallon per minute at 5000 p.s.i. wth 200 SSU oil. The pump is driven by a 1½ horsepower, 220/440 volt, 3 phase, 60 cycles, totally enclosed fan-cooled motor 40. The pump discharges to a relief valve 43 and through a stainless steel ball check valve 47, and a filter 49 to a high pressure accumulator 29 having a capacity of 2½ gallons. The accumulator 29, which is of the bladder type, is gas precharged to 1500 p.s.i., and has a normal operating pressure range from 3000 to 3500 p.s.i. It is capable of providing a pulse train of about 0.3 sec. duration with 10% drop in supply pressure in normal operation.

An electro-hydraulic serva valve 30 controls the flow between the high pressure accumulator 29 and the lower chamber 23 of the hydraulic cylinder 20 and is basically a high performance 2-stage closed center, four-way sliding spool valve rated at 10 gallons per minutes with a 1000 p.s.i. drop across the valve. It is capable of operating at 120 cycles per second. The hydraulic cylinder 20 has a cross sectional area of 96 cm.$^2$. The lower chamber 23 discharges into a low pressure accumulator 34 which is toroidal in shape and has a 4 inch thickness, a ⅛ inch thick wall, and a center-line diameter of 37½ inches. The heat exchanger 35 is capable of dissipation of heat in 120° F. ambient air while holding the oil temperature to 150° F.

The oscillating force applied to the force plate 17 has a peak to peak swing of $10^{10}$ dynes. The area of the circular force plate is $2.5 \times 10^4$ sq. cm. The pressure at the interface of the force plate 17 and the water is $2 \times 10^5$ dynes per cm.$^2$. At a frequency of 40 c.p.s. or wavelength of $3.8 \times 10^3$ cm. in water, the power radiated by the plate 17 in the direction normal to the plate is 5 watts per steradian.

The bar of the embodiment of FIGURE 1 is in the form of a steel beam 1" wide and 2" high and 42" long. With weights 86 of 32 lb. each attached to the 18½ inches from the center of the beam, a resonant frequency of 48 c.p.s. is produced. The beam may be rotated 90° about its axis so that it is 1" high and 2" wide with the result that the resonant frequency is lowered to 24 c.p.s.

In the embodiment shown in FIGURE 4, the discs 88 may be made of ⅝ inch thick steel. A disc with a radius of 1.8 feet results in a resonant frequency for the system of about 25 c.p.s. Another disc with a radius of 0.9 foot results in a resonant frequency of about 100 c.p.s. In these embodiments, the central part of the discs 88 functions as the spring member 18 while the peripheral part functions as the inertial member 19, the intermediate parts performing some of both functions. A ring 90 of equal mass clamped to the smaller of the two discs causes the resonant frequency to change to about 45 c.p.s.

In the embodiment shown in FIGURE 5, a three foot long fluid spring cylinder 92 is provided having an inner diameter of 6". The liquid 98 in the cylinder has a bulk modulus of the order of $3 \times 10^5$ lbs./sq. in. The movable mass 94 weighs 95 lbs. The resonant frequency is 385 c.p.s. when none of the valves 102 are open and may be reduced to the order of 5 c.p.s. by suitable openings of various of the valves 102.

In the embodiment shown in FIGURE 6, a double acting ram such as that made by Miller Fluid Power under the designation "Model H" may be utilized as the piston 106 and cylinder 107. The fluid utilized may be compressed air or a monatomic gas such as helium or argon. The pressure in the accumulators may be varied between a few hundred and 1500 lbs./sq. in. to control the frequency.

Various changes and modifications may be made in the above described sound source without departing from the scope of the invention. For example, the resonant frequency of the embodiment of FIGURE 5 should be changed by changing the pressure in the accumulators, as was illustrated in FIGURE 6. Conversely, additional accumulators could be brought into communication with the fluid spring chamber in the embodiment of FIGURE 6, as was illustrated in FIGURE 5, thus changing the effective volume of the gas containing cavity and changing the resonant frequency. The use of multiple accumulators provides a means of changing frequency rapidly and is preferable in certain instances such as in my previously mentioned copending applications entitled "Method and System for Range and Relative Velocity Detection" and "Method and System for Communication of Information."

Furthermore, where the medium 16 is earth, the force plate may be coupled to the medium by a variety of means including an anchor secured in a hole in the earth where the nature of the terrain makes this feasible. In addition, the radiating member need not be a flat force plate but could even be an elongated anchor secured in the earth.

Various features of the invention are set forth in the accompanying claims.

What is claimed is:

1. A sound source comprising a radiating member for coupling to a sound transmitting medium so that movement of said radiating member causes sound waves in the medium, a hydraulic power source, an oscillatory system adapted for oscillatory motion and including a spring member and an inertial member coupled to one another, said power source being coupled between said spring member and said radiating member, and control means adapted for periodically actuating said power source so as to cause periodic movement of said radiating member and said oscillatory system at the resonant frequency of the sound source including both said oscillatory system and said radiating member, as coupled to the medium.

2. A sound source according to claim 1 wherein said power source is coupled between said spring member and said radiating member by means of a piston and cylinder assembly having a piston element and a cylinder element defining a chamber, said spring member being connected to one of said elements, said radiating member being connected to the other of said elements, and said power source being connected to said chamber so that periodic actuation of said power source causes periodic opposite forces to be applied to said radiating member and said spring member, respectively, at the frequency of said actuation.

3. A sound source according to claim 2 wherein said piston element and said cylinder element define a first chamber and a second chamber and wherein said power source is connected to said first chamber, said sound source including a confined gas in communication with said second chamber.

4. A sound source according to claim 1 wherein said oscillatory system comprises a flexible bar having two freely movable ends and coupled to said power source adjacent the center of said bar and two equal masses attached to said bar on respective opposite ends thereof equidistant from said center.

5. A sound source according to claim 1 wherein said oscillatory system comprises a flexible disc having a freely movable periphery and coupled to said power source adjacent the center of said disc.

6. A sound source according to claim 5 wherein said oscillatory system includes an annular mass attached to said disc adjacent the periphery of said disc.

7. A sound source according to claim 1 wherein said oscillatory system includes a chamber defining a cavity, a compressible fluid disposed in said cavity and a piston freely movable in its entirely and disposed in said chamber and dividing said cavity into two parts so that said fluid provides a restoring force for said oscillatory system.

8. A sound source according to claim 7 wherein said piston comprises said inertial member and said chamber is connected to said power source.

9. A sound source according to claim 7 wherein said chamber comprises said inertial member and said piston is connected to said power source.

10. A sound source according to claim 7 wherein said compressible fluid is a gas.

11. A sound source according to claim 1 including adjustment means for selectively adjusting the resonant frequency of the sound source including both said oscillatory system and said radiating member as coupled to the medium.

12. A sound source according to claim 11 wherein said adjustment means comprises means for changing the spring constant of said oscillatory system.

13. A sound source according to claim 4 including adjustment means for selectively adjusting the resonant frequency of the sound source as coupled to the medium, said adjustment means comprising a plurality of masses adapted to be attached to said bar at predetermined points.

14. A sound source according to claim 5 including adjustment means for selectively adjusting the resonant frequency of the sound source as coupled to the medium, said adjustment means comprising a plurality of flexible discs adapted to be coupled to said power system adjacent their centers and having different masses and moduli of elasticity.

15. A sound source according to claim 6 including adjustment means for selectively adjusting the resonant frequency of the sound source as coupled to the medium, said adjustment means comprising a plurality of annular masses adapted to be attached to said disc adjacent its periphery.

16. A sound source according to claim 10 including adjustment means for selectively adjusting the resonant frequency of the sound source as coupled to the medium, said adjustment means comprising means for changing the pressure in said cavity.

17. A sound source according to claim 1 wherein said control means applies a signal of a selected frequency to said power source so as to actuate said power source at said resonant frequency of the source, including both said oscillatory system and said radiating member, as coupled to the medium or a subharmonic thereof.

18. A sound source according to claim 17 including adjustment means for selectively adjusting said selected frequency of said signal.

19. A method of generating sound waves in a medium with a sound source having a radiating member and an oscillatory system adapted for oscillatory motion, said oscillatory system having a spring member and an inertial member coupled to one another, said method comprising the steps of coupling the radiating member to the medium, coupling the spring member of the oscillatory system to the radiating member, and periodically applying respective opposite forces to the spring member of the oscillatory system and the radiating member at the resonant frequency of the sound source, including both said oscillatory system and said radiating member, as coupled to the medium or a subharmonic thereof, whereby sound waves are produced in the medium.

20. A method of generating sound waves according to claim 19 including the step of simultaneously changing said resonant frequency and the frequency at which forces are applied to the spring member and the radiating member.

21. A method of generating sound waves according to claim 19 wherein said sound waves are generated in descending order of frequency.

22. A method of generating sound waves according to claim 19 wherein said resonant frequency is changed by changing the spring constant of said oscillatory system when said inertial member is at zero displacement from equilibrium.

23. A sound source comprising a radiating member for coupling to a sound transmitting medium so that movement of said radiating member causes sound waves in the medium, a hydraulic power source, an oscillatory system having a spring member and an inertial member, and including a chamber defining a cavity, a compressible fluid disposed in said cavity and a piston movably disposed in said chamber and dividing said cavity into two parts, said power source being coupled between said spring member and said radiating member, control means for periodically actuating said power source so as to cause periodic movement of said radiating member at the resonant frequency of the sound source as coupled to the medium, and adjustment means for selectively adjusting the resonant frequency of the sound source as coupled to the medium, said adjustment means comprising a plurality of accumulators containing gas communicating with said cavity and means for selectively connecting said accumulators and said cavity.

24. A sound source comprising a radiating member for coupling to a sound transmitting medium so that movement of said radiating member causes sound waves in the medium, a hydraulic power source, an oscillatory system having a spring member and an inertial member and including a chamber defining a cavity, a compressible fluid disposed in said cavity and a piston movably disposed in said chamber and dividing said cavity into two parts, said power source being coupled between said spring member and said radiating member, control means for periodically actuating said power source so as to cause periodic movement of said radiating member at the resonant frequency of the sound source as coupled to the medium, and adjustment means for selectively adjusting the resonant frequency of the sound source as coupled to the medium, said adjustment means comprising a plurality of accumulators containing gas communicating with said cavity and means for selectively adjusting the pressure in said accumulators.

25. A sound source comprising a radiating member for coupling to a sound transmitting medium so that movement of said radiating member causes sound waves in the medium, a hydraulic power source, an oscillatory system having a spring member and an inertial member and including a chamber defining a cavity, a gas disposed in said cavity and a piston movably disposed in said chamber and dividing said cavity into two parts, said power source being coupled between said spring member and said radiating member, control means for periodically actuating said power source so as to cause periodic movement of said radiating member at the resonant frequency of the sound source as coupled to the medium, and adjustment means for selectively adjusting the resonant frequency of the sound source as coupled to the medium, said adjustment means comprising means for changing the effective volume of said cavity.

References Cited
UNITED STATES PATENTS

| | | | |
|---|---|---|---|
| 2,281,751 | 5/1942 | Cloud | 181—0.5 |
| 2,745,507 | 5/1956 | Bodine | 181—0.5 |
| 2,773,482 | 12/1956 | Dickie | 73—71.6 X |
| 2,890,584 | 6/1959 | Dickie | 73—71.6 |
| 3,122,664 | 2/1964 | Loeb | 181—0.5 |
| 3,123,728 | 3/1964 | Kreiskorte | 181—0.5 |
| 3,208,550 | 9/1965 | Castanet et al. | 181—0.5 |
| 3,216,525 | 11/1965 | Fail et al. | 181—0.5 |
| 3,229,784 | 1/1966 | Lyons et al. | 181—0.5 |
| 3,282,371 | 11/1966 | Miller | 181—0.5 |
| 3,282,372 | 11/1966 | Brown et al. | 181—0.5 |

OTHER REFERENCES

Weber et al.: Physics for Science and Engineering, McGraw-Hill, New York, N.Y., 1957, pp. 135–136.

BENJAMIN A. BORCHELT, *Primary Examiner.*

W. KUJAWA, *Assistant Examiner.*